United States Patent
Mouy (10) Patent No.: US 9,019,206 B2
(45) Date of Patent: Apr. 28, 2015

(54) USER-INTERFACE FOR CONTROLLING A DATA PROCESSING SYSTEM USING A JOYSTICK

(75) Inventor: Sebastien Mouy, Eindhoven (NL)

(73) Assignee: NXP, B.V., Eindhoven (NL)

( * ) Notice: Subject to any disclaimer, the term of this patent is extended or adjusted under 35 U.S.C. 154(b) by 298 days.

(21) Appl. No.: 13/276,347

(22) Filed: Oct. 19, 2011

(65) Prior Publication Data

US 2012/0098747 A1   Apr. 26, 2012

(30) Foreign Application Priority Data

Oct. 20, 2010   (EP) .................................... 10188213

(51) Int. Cl.
*G09G 5/08* (2006.01)
*G06F 3/0362* (2013.01)
*G06F 3/0338* (2013.01)

(52) U.S. Cl.
CPC ............ *G06F 3/0362* (2013.01); *G06F 3/0338* (2013.01)

(58) Field of Classification Search
CPC combination set(s) only.
See application file for complete search history.

(56) References Cited

U.S. PATENT DOCUMENTS

| 7,499,040 B2 | 3/2009 | Zadesky et al. |
| 2008/0087476 A1 | 4/2008 | Prest et al. |
| 2011/0031380 A1 | 2/2011 | Phan Le |
| 2011/0168874 A1 | 7/2011 | Phan Le |
| 2011/0240836 A1 | 10/2011 | Phan Le |

FOREIGN PATENT DOCUMENTS

| CN | 1926604 A | 3/2007 |
| CN | 101641663 A | 2/2010 |
| EP | 1 467 392 A2 | 10/2004 |
| WO | 2008/054955 A2 | 5/2008 |
| WO | 2010/020906 A1 | 2/2010 |

OTHER PUBLICATIONS

Extended European Search Report for European Patent Appln. No. 10188213.2 (Mar. 24, 2011).
China counterpart application No. 201110317548.5 office action dated Dec. 4, 2013.

*Primary Examiner* — Van Chow (57) ABSTRACT

A user-interface for controlling a data processing system using a joystick includes a joystick for controlling input to the data processing system. The joystick has a pivoting component for assuming tilted positions by tilting in directions that lie in a reference plane associated with the component, and a sensor for sensing at succeeding sampling moments the direction corresponding to succeeding tilted positions of the component, and a difference determination device for determining a difference in direction between a first direction sensed at a first sampling moment and a second direction sensed at a second sampling moment after the first moment, and a parameter modifier for modifying a value of a parameter of the data processing system by adding or subtracting a difference value that depends upon the difference in direction.

13 Claims, 4 Drawing Sheets

USER-INTERFACE FOR CONTROLLING A DATA PROCESSING SYSTEM USING A JOYSTICK

This application claims the priority under 35 U.S.C. §119 of European patent application no. 10188213.2, filed on Oct. 20, 2010, the contents of which are incorporated by reference herein.

FIELD OF THE INVENTION

The invention relates to a user-interface for a data processing system, the user-interface comprising a joystick configured for manually controlling input to the data processing system, the joystick comprising a pivotally movable component having associated therewith a reference axis and a reference plane orthogonal to the reference axis, the component being enabled for assuming tilted positions by being inclined away from the reference axis into corresponding directions, the corresponding directions lying in the reference plane, and a sensor configured for sensing at succeeding sampling moments the direction corresponding with succeeding tilted positions of the component.

The invention further relates to a joystick.

The invention further relates to method of obtaining input for a data processing system, to a corresponding computer program and to computer readable medium.

BACKGROUND OF THE INVENTION

International patent application PCT/IB2009/051485, included herein by reference and published WO/2009/125360 with title "Optical pointing device having improved environmental resistance and reflected noise prevention and compensation" discloses an optical pointing device. The optical pointing device comprises a base and an actuator movable connected to the base, the actuator comprises a reflective portion on a side facing the base, and the base comprises a light source for emitting light towards the reflective portion of the actuator, a detector comprising one of more detection units for detecting at least a part of the light reflected by the reflective portion of the actuator, and a transparent element arranged between the actuator and at least one of the light source and the detection units, for providing a closed transparent housing for the light source and/or the detection units. See also, international patent application PCT/IB2009/054036, included herein by reference and published WO/2010/035170 with title "Detection system for the detection of movements of a movable object, a method of detecting movements of a movable object, and an IC having implemented therein the detection system"

Such optical pointing devices are convenient for use, e.g., for their high accuracy, and for the small form factor in which they may be made, etc. There has been an interest in processing signals produced by such an optical pointing device. For example, International patent application PCT/IB2009/053520, included herein by reference and published WO/2010/020906 with title "Method and device for processing signals from a pointing device", describes a method for processing signals from a pointing device which may in particularly be used with such an optical pointing device. The optical pointing device used therein comprises a detector which is adapted for providing at least first and second positional signals indicating a position of the actuator with respect to the base along corresponding first and second axes. The signal processing method comprises the steps of converting the at least two positional signals into a polar coordinate signal comprising a magnitude signal, and thresholding the magnitude signal of the polar coordinate signal to provide a thresholded magnitude signal. It is also described how a conversion curve may be applied to the thresholded magnitude signal to produce a velocity magnitude signal.

Using such a method, the optical pointing device is even better suited for some applications; for example, in applications wherein, casual or small inadvertent or spurious changes to the actuator are to be ignored to obtain a higher precision and/or control for an operator of the device.

An optical pointing device, such as an optical joystick, based on the measurement of a light reflection can replace such pointing devices as the 4-ways buttons or the digital joystick. An optical joystick can is typically analog by design joystick and enables much more than 4 or 8 predefined directions; covering virtually any angle and intensity (representing how hard one presses on the joystick).

A joystick is a device that enables to control an application running on a data processing system, by tilting a component of the joystick, such as stick or a knob in different directions, e.g., in north/south/east/west directions. The tilt is converted to pointing information, which in turn may be used, e.g., in a user-interface of the application, thus controlling the movement of a pointer. The location of the pointer is interpreted through the user-interface, for example, by converting the location of the pointer at the time of specific event, e.g., a click action performed on a click-input device of the joystick, e.g., a button, as a command-input. In response to the command-input the data-processing start execution of a computer program routine associated with the command-input. For example, the command-input may be the command to start reading a file, the associated computer program routine a sequence of computer instructions to read a file from storage.

The joystick may have centralizing means to return the component into a neutral position when no force is exerted on it. For example, the centralizing means may comprise springs.

Converting a tilting angle to an input to a data processing application differentiates joysticks from others types of input devices. For example, a mouse converts motion, a track-ball rolling, and a touch pad sliding, into command-inputs. Because of the mechanical aspect of a joystick, this control feels very natural to the end-user, and can efficiently replace the navigation-keys, the track-ball, optical sensor or a mouse. Nevertheless, it is an observation of the inventors that joysticks are typically used for pointing tasks.

SUMMARY OF THE INVENTION

It would be of advantage to have a user-interface operable with a joystick wherein the joystick could be used for more different ways of providing a data processing system with input, than as a pointing device.

This is achieved in a user-interface for a data processing system comprising a joystick configured for manually controlling input to the data processing system. The joystick comprises a pivotally movable component having associated therewith a reference axis and a reference plane orthogonal to the reference axis, the component being enabled for assuming tilted positions by being inclined away from the reference axis into corresponding directions, the corresponding directions lying in the reference plane, and a sensor configured for sensing at succeeding sampling moments the direction corresponding with succeeding tilted positions of the component.

The user-interface comprises a difference determination device configured for determining a difference in direction between a first direction sensed at a first sampling moment and a second direction sensed at a second sampling moment after the first moment, and a parameter modifier configured for modifying a parameter value of a parameter of the data processing system by adding or subtracting a difference value, the difference value depending upon the difference in direction. The joystick has a component which the user can move to indicate a direction. The component and the joystick could as an example, be used as a pointing device, wherein the component is moved into a direction to indicate a desired movement of, e.g., a pointer of the user-interface.

The component is pivotally movable, that is, it can be tilted into any direction with respect to a pivot point, such as a spherical joint. The pivot point is the fixed center of a three dimensional rotation that moves the component. This type of movement of the component will be referred to as 'pivotally movable'. When the component is pivotally moved with respect to its pivot point, it remains in the same orientation with respect to the pivot point. In a preferred embodiment, the component is only pivotally movable.

For convenience the direction in which the component is tilted is defined with respect to a reference axis and a reference plane. Typically, the reference axis runs through the spherical joint. Typically, the reference plane is horizontal with respect to the component. That is, if the component is a knob, an upper surface of the knob could be parallel to the reference plane. If the component is a stick, the reference plane could be perpendicular to the stick, while the reference axis runs through the stick, e.g., being parallel with the stick. Preferably, the knob is round, allowing a circular movement along a rim of the knob.

The tilt of the component is sensed at a first sampling moment and at a second sampling moment. The detected tilt at the first and second moments may have a different direction. This difference in direction would be caused by the operator of the joystick, by manipulating the tilt of the component from a first direction to a second direction. When viewed, as is convenient, in the reference plane, a first tilt direction shifts to a second tilt direction. To the user, this shift feels as if a rotatable knob is turned, even though in reality the component need not actually be rotatable, just tiltable. The difference between the first and second direction is determined by a difference determination device and based thereupon the difference a difference value is determined; this could be done by the difference determination device as well, or by a difference value determinator. Finally, a parameter value of a parameter of the data processing system is modified by a parameter modifier by adding or subtracting a difference value.

The parameter in its turn is typically a parameter of an application which is controlled through the user interface. The application could be running on the data processing system but this is not necessary; the application could also be running on a remote computer under the control of a user interface operated locally.

Note that there may be a second aspect to the tilt, namely, how far the component is tilted into a particular direction. It was an insight of the inventor that this aspect of tilt is not directly needed for operating the user interface in the manner described above.

Using this user interface a joystick can be used as a rotary knob. By simply operating the joystick in a circular manner, the user interface can determine an angle that represents the rotation that would be obtained if an actual rotary knob were used. An advantage of this user interface is that the rotation is not directly measured, e.g., but indirectly through observing the tilt of the device. Directly observing rotation may even be impossible, if the component is not rotatable, or due to form factor limitations.

If the component were actually rotatable, the rotation could be measured directly, for example, by mechanically connecting the component to a potentiometer, and thus converting rotation into an electrical resistance which can be measured. However using the invention, such additional sensing equipment is not necessary. This reduces cost, simplifies manufacture and makes the joystick more robust.

In more and more application, and especially in mobile applications, such as mobile phones, the user interface should be intuitive and comfortable. However, these kinds of pocket-devices become ever smaller, leaving little room for the large user-interfaces that are available on more "static" devices, such as a home stereo or a desktop computer. Because of the small amount of space allocated to the interface on embedded technologies, and because these interfaces must be energy efficient, the interface is often reduced to a certain amount of keys, more or less nicely arranged into keyboard and four-ways buttons, or more recently on touch-screen. However, the precision of a touch-screen or touch-pad is lower than of a joystick.

For some applications, pointing devices with lower precision such as a touch device, such as a touch screen/pad or a device such a track ball may be used as a replacement of a mouse. But such devices are not suitable to replace higher precision devices such as the 4-ways buttons, or the joystick, even if a 4-ways digital joystick. For this reason, the invention is a welcome addition to data input capabilities of the joystick making this device even more suited for use, even in, user applications stressing ease of input.

Although emulating a rotation is possible when the component comprises a stick, it is considered more convenient when the movable component has a flat surface in the direction of the reference axis. In a preferred embodiment, the surface is suitable or sliding over with a human finger emulating the rotation of a rotary knob. Preferably, the finger slides along the rim of the knob in a circularly motion. In an embodiment, the difference in direction is representative for the angle travelled by the finger as seen from a reference point on the knob, say the intersection of the reference axis and the knob.

Although we refer to a "joystick", the component need not necessarily be supplied with a stick. If component is supplied with a knob, there are several advantages. First the joystick is more suitable for devices intended to be carried around, such as mobile devices, such as mobile phones—there is no protruding stick. Furthermore, using the joystick as a rotary knob becomes much more natural. The user can slide over the knob mounted on the component in a very similar manner as he could turn an actual turning rotary knob.

What we call a rotary knob is in itself a well-known device. For example, on a typically home stereo say, one probably has one or two rotary knobs on the front-panel. For example, to adjust the volume, in most cases, you have to turn a rotary knob. The more one turns into one direction, the more the volume is increased, and the more you turn in the opposite direction the less volume you get. Note that it makes no difference at what point the user grabs a rotary knob; it is the amount of rotation that determines the volume adjustment. The invention achieves as similar effect, it makes no difference at what point the user start his rotary movement over the knob and where he finishes it, it is the amount of direction shift, indicated by the user's movement that determines the changes in the parameter, say a volume parameter.

By sliding your finger on the knob in a circular motion, like one would do for any flat rotary knob, the finger necessarily will press slightly on the side of the knob. This tilt is detected by the sensing device. Because this tilt is detected, we then know exactly where the finger touches the knob; that is, we may determine in which direction the knob is tilted, for example by determining at which angle the knob is touched. When sliding the finger around the center of the knob, the angle changes and we can then track what rotation has been achieved by the finger.

In an embodiment, a wheel is attached to the component rotatable with respect to the reference axis, the user interface being configured for indirect measurement of a rotation of the wheel by determining the difference in direction, the difference in direction being representative of the rotation.

To make the rotation movement more natural for the user, it is possible to attach a rotatable wheel to the component. When the user makes a rotating movement with the component, the wheel moves with the user's movement. This makes it easier to perform the rotating movement, as there is less friction between a wheel and its axis, than between a finger, say a thumb, and the component surface. Preferably, the wheel is combined with a knob as component.

When the user rotates the wheel, he presses somewhat on the wheel. This causes a tilt in the component. This tilt is measured, and from the tilt an angle is derived. It is thus avoided that the actual rotation of the wheel needs to be measured directly. An additional rotation sensing device is thus avoided. The axis of the wheel may be attached to the component. The turning axis of the wheel may be supported by a bearing.

In an embodiment, the wheel comprises a small grip. The grip makes it easier perform fine grained control.

In general, tilted positions of the component may be sensed at multiple moments to obtain multiple tilt-measurements. One may derive multiple successive angles and observe the actual rotation, e.g. as the difference of the measured angles.

In an embodiment, the magnitude of the difference value depends upon the magnitude of the difference in direction. The way the difference in direction influences the parameter can vary. But to transfer more information, the magnitude of the difference in direction can be used was a way for the user to indicate the amount of desired change. The magnitude of the difference in direction may be expressed an angle, say in radians, or a representation thereof.

In an embodiment, the sign of the difference value depends upon the orientation of the difference in direction with respect to a further reference axis lying in the reference plane.

Also the direction in which the user performs the rotating movement over the component can give information. For example, this sign may represent if the parameter is to be increased or decreased respectively.

By combining the information from the orientation of the difference in direction and of the magnitude of the difference in direction a user can indicate if a parameters is to be increased or decreased and in what extend.

In an embodiment, the difference determination device (120) is configured for determining a first orientation with respect to the further reference axis of the difference in direction between the first direction and an intermediate direction, and configured for determining a second orientation with respect to the further reference axis of the difference in direction between the intermediate direction and the second direction, the intermediate direction being sensed at an intermediate sampling moment, the intermediate sampling moment being between the first sampling moment and the second sampling moment. The difference determination device is configured for determining the difference in direction between the first direction and the second direction only if the first orientation is the same as the second orientation.

By taking an intermediate sampling moment into account it is verified that the user indeed slid from a first tilted position, corresponding to the first direction, to the second tilted position, corresponding to the second direction, instead of pushing the component into the two positions after one another, which would lead to having the component back into the neutral center-position between these two events. By observing the tilt of the component during multiple moment, i.e., at least three, and verifying if the observed change in the position of the tilt is in agreement with a sliding movement of the user, the chance of reporting two successive tilts of the component as one rotation is reduced.

In an embodiment, the sensor is configured for expressing a sampled tilt in coordinates with respect to a Cartesian coordinate system of the reference plane, the difference determination device being configured for determining the direction lying in the reference plane of a tilt from coordinates of the tilt.

One convenient way for sensing the tilt of the component is by measuring the tilt along two axes. The tilt in each axis is naturally represented as a coordinate along this axis. However, for the invention it is more convenient to express the tilt in terms of the direction lying in the reference plane. One way to perform this transformation is to convert the Cartesian coordinates into polar coordinates. The polar coordinates can be represented as a pair comprising a radial coordinate and an angular coordinate. However, in an embodiment only the angular coordinate is computed.

The radial coordinate can be represented as the distance between a point in the reference plane indicated by the tilt, say in the form of Cartesian coordinates, and a fixed point. The fixed point can be the intersection between the reference axis and the reference plane.

The angular coordinate can be represented as the angle between a direction in the reference plane indicated by the tilt and a fixed direction. For convenience a further reference axis lying in the reference plane may be associated with the component; and the first direction and the second direction may be expressed as an angle with the further reference axis.

A further aspect of the invention concerns a joystick configured for manually controlling input to a data processing system. The joystick comprises a pivotally movable component having associated therewith a reference axis and a reference plane orthogonal to the reference axis, the component being enabled for assuming tilted positions by being inclined away from the reference axis into corresponding directions, the corresponding directions lying in the reference plane, and a sensor configured for sensing at succeeding sampling moments the direction corresponding with succeeding tilted positions of the component The joystick further comprises a difference determination device configured for determining a difference in direction between a first direction sensed at a first sampling moment and a second direction sensed at a second sampling moment after the first moment, the joystick being configured for supplying the difference in direction on a data output of the joystick.

The joystick can both provide input in the form of pointing information but also information consistent with a rotary knob.

A further aspect of the invention concerns a method of obtaining input for a data processing system, the method comprising sensing at succeeding sampling moments a tilt of a pivotally movable component of a joystick, the component having associated therewith a reference axis and a reference plane orthogonal to the reference axis, the component being tilted by being inclined away from the reference axis into corresponding directions, the corresponding directions lying in the reference plane. The method comprises determining a difference in direction between the direction of a first tilt at a particular sampling moment and the direction of a second tilt assumed at a succeeding one of the sampling moments.

An embodiment of the method comprises modifying a parameter value of a parameter of the data processing system by adding or subtracting a difference value, the difference value depending upon the difference in direction.

A further aspect of the invention concerns a computer program comprising computer program code means adapted to perform all the steps of a method according to the invention when the computer program is run on a computer having a joystick. In an embodiment, the computer program is stored on a computer readable medium.

Note that to implement the user interface, method or the computer program, a known joystick may be used.

In an embodiment, the user interface, joystick, method or computer program according to the invention is implemented using an optical joystick. For example, an optical joystick as previously described in the background The tilt causes when a finger presses slightly on the side of the component, e.g. knob, can be small. An optical joystick is very sensitive; a tilt of less than one degree is sensed. This makes it a good candidate for re-use as a rotary knob.

Although the invention can be applied to any type of joystick, say a digital joystick. To obtain the most user-friendly interface, one preferably uses an analog and sensitive device mounted with a flat knob.

The user interface and joystick may be used in an electronic device, such as a set-top box or a computer, in particular in a mobile electronic device, such as mobile phone.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc.

There are many applications for the invention, using the rotary knob style user-interface according to the invention is not limited to volume adjustment. The invention may be used to tune a radio, switch between the different functions of a product, or as a multi-function tuner in general. Tuning in particular is an activity that is well suited for this user-interface. In tuning a user needs to make small adjustments that are not absolute, but relative to the current position of a tuning parameter.

In a further embodiment, a timer measures an amount of time elapsed between the first tilt and the second tilt. The adjustment of the parameter is further dependent on the time elapsed. For example, from the difference in direction and the amount of time elapsed an angular velocity may be determined, e.g., by dividing the difference in direction, say in radians, by the amount of time, say in seconds. In an embodiment, the adjustment of the parameter is depends on the angular velocity.

For example: To get much more volume, make a turning motion across the component fast. To get a fine grain volume setting, make a turning motion across the component slowly.

A user interface according to the invention can return a digital value indicating a rotation without making use of an additional dedicated potentiometer.

A user-interface for controlling a data processing system using a joystick is provided. The user-interface comprises comprising a joystick configured for manually controlling input to the data processing system. The joystick comprises a pivotally movable component configured assuming tilted positions by tilting into corresponding directions, the corresponding directions lying in a reference plane associated with the component, and a sensor configured for sensing at succeeding sampling moments the direction corresponding with succeeding tilted positions of the component. The user-interface comprises a difference determination device configured for determining a difference in direction between a first direction sensed at a first sampling moment and a second direction sensed at a second sampling moment after the first moment, and a parameter modifier configured for modifying a parameter value of a parameter of the data processing system by adding or subtracting a difference value, the difference value depending upon the difference in direction. Using the user-interface, a user can control a computer application using rotating movement even though using a joystick.

BRIEF DESCRIPTION OF THE DRAWINGS

The invention is explained in further detail by way of example and with reference to the accompanying drawings, wherein.

Throughout the Figures, similar or corresponding features are indicated by same reference numerals.

LIST OF REFERENCE NUMERALS 100 a joystick
112 a component
114 a sensor
120 a difference determination device
130 a parameter modifier
140 a data processing system
150 an output device
210 a reference plane
220 a reference axis
230 an angle between axis 220 and tilt 270
240 an angle between axis 260 and direction 272
242 an angle between axis 260 and direction 274
250 an origin
252 a threshold
260 a further reference axis lying in the reference plane
270 a tilt
272 a direction lying in the reference plane
274 a second direction lying in the reference plane
310 a joystick
320 a wheel 600 a mobile phone
601 a joystick

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Figure 1:
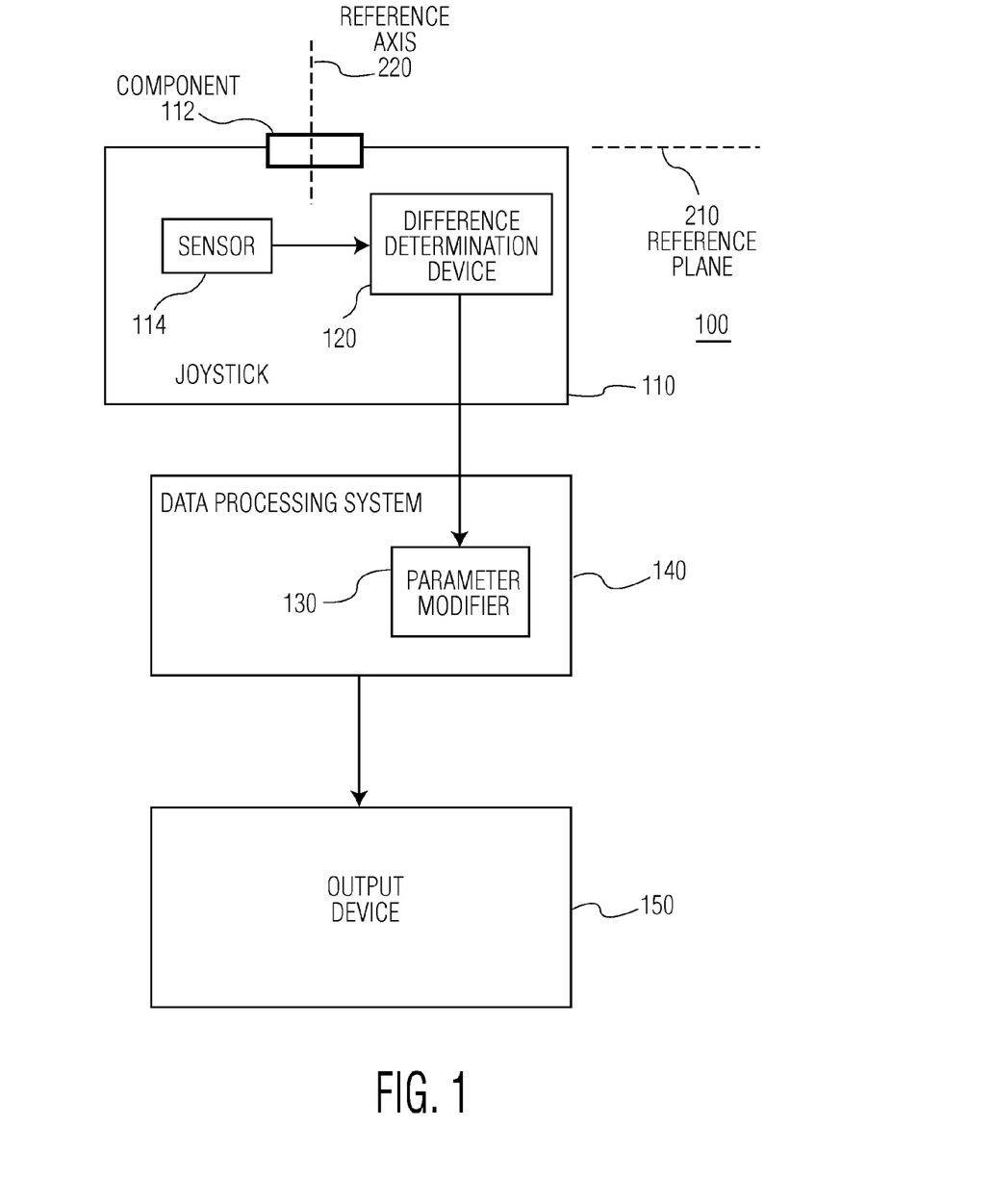
FIG. 1 is a block diagram illustrating schematically a first embodiment of the user interface according to the invention.
Figure 2A:
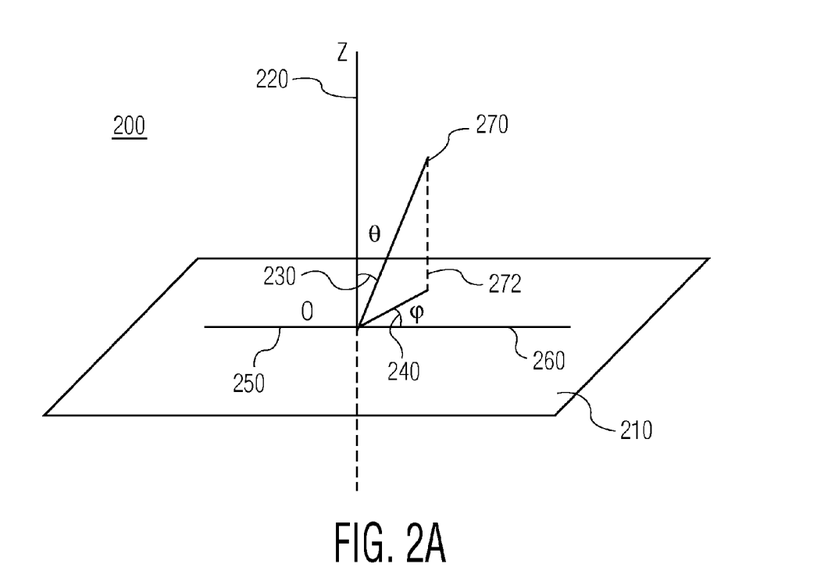
FIG. 2a is a drawing illustrating the reference plane in a three dimensional view.
Figure 2B:
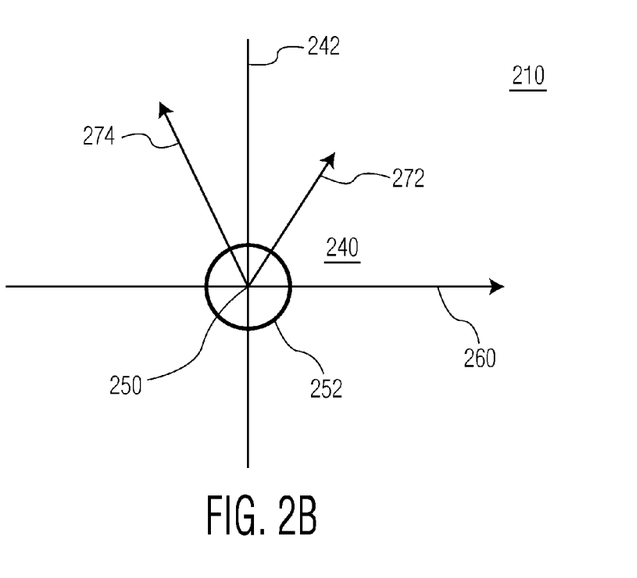
FIG. 2b is a drawing illustrating the reference plane in a two dimensional top view.

FIG. 1 is a block diagram illustrating schematically a system 100, comprising a first embodiment of the user interface according to the invention. It will be convenient to describe the operation of the device with the aid of a number of reference elements. These reference elements are virtual elements which do not correspond with actual physical elements, although they may be associated to various elements of the embodiments of the invention. The reference elements are illustrated in FIGS. 2a and 2b. FIG. 2a shows a three dimensional view of the reference elements, whereas FIG. 2b shows a top view of the reference plane 210.

The first embodiment shown in FIG. 1 comprises a joystick 100. Joystick 110 may be any type of joystick as long as it is configured for sensing data from which a direction of tilt of a component may be determined. For example, joystick 100 may be a digital joystick, e.g., a four-button type joystick. Preferably, joystick 100 is an optical joystick.

The joystick comprises a movable component 112. Various choices are possible for the form of component 112. For example, component 112 may comprise a stick, protruding away from joystick 110. It is preferred if component 112 comprises a knob having a flat surface. FIG. 1 schematically shows such a knob. In a preferred embodiment, the knob has a diameter between 1 and 2 cm, corresponding to the size of a human thumb. In a preferred embodiment, the knob is circular. In a preferred embodiment, the knob is smooth. As an example, the knob may have a metallic surface.

Typically, component 112 is not freely movable but is constrained in that it tilts with respect to a spherical joint, acting as a pivot point. The spherical joint may be virtual. Optionally, component 112 may also be rotatable around an axis. Typically, the spherical joint would lie on the axis. Although the user interface according to the invention enables a rotational type of input device, it is not necessary for component 112 to actually be rotatable. It is sufficient for the user to make a rotating movement over component 112.

A user of joystick 110 may move component 112 within the boundaries allowed by component 112 constraints. The movement of component 112 is sensed by a sensor 114. One possibility is that analogue sensors arranged along two axes sense the movement of component 112. Another possibility is that component 112 reflects light coming from sensor 114, the reflection being representative for the movement. Preferably, sensor 114 is an analogue sensor, i.e., sensitive for all directions.

Sensor 114 may forward a first signal indicating the direction in which component 112 is moved with respect to reference axis 220 and a second signal indicating the magnitude of the direction. However, sensor 114 may also indicate the movement of component 112 using Cartesian coordinates, indicating the how far a virtual point of reference axis 220 would move from an origin 250.

Joystick 110 further comprises a difference determination device 120. Difference determination device 120 is arranged to convert the tilting of component 112 as sensed by sensor 114 into a relative amount indicating how far the tilt has shifted. For example, difference determination device 120 may detect the onset of tilting, by receiving a signal from component 112, and then record the current tilt of component 112. When component 112 returns to a neutral position difference determination device 120 may conclude that the shift in direction has ended, and record a second tilt. From the two tilt position the difference in direction may be determined. Optionally, difference determination device 120 can track the movement of the tilt by tracking the sensing at regular sampling intervals, and determine if the amount of shift has increased at least by a pre-determined amount. In this way, it is verified that the movement of the finger on component 112 closely follows a rotary movement. Furthermore, difference determination device 120 could verify if the magnitude of tilt remains over a pre-determined lower bound and/or under a pre-determined upper bound. If the magnitude is between the pre-determined lower bound and the pre-determined upper bound, this indicates that the user makes a smooth and defined rotating movement. In one embodiment, these two controls (regular sampling and bounds) are combined.

The difference in direction as determined by difference determination device 120 from sensing data obtained from data processing system 140 is forwarded to a parameter modifier 130. Parameter modifier 130 is shown here as part of a data processing system 140. Data processing system 140 may execute an application, some aspect of the application being under the control of the parameter. For example, the parameter may be stored in a storage, e.g. a memory or a register, of data processing system 140, and parameter modifier 130 may comprise computer program code to alter the content of the storage. The storage could be an I/O port and parameter modifier 130 may comprise hardware means to alter it.

Preferably, the parameter also influences an output device output device 150, e.g. a display, connected to data processing system 140. For example, output device 150 may show a display of a rotary knob which is turned in correspondence with the turning movement data obtained from joystick 110.

For example, parameter modifier 130 may multiply an angle difference obtained by difference determination device 120 with a pre-determined constant and add the result to the parameter. The angle difference may be signed indicating the direction of turning, thus an addition may result in decreasing the parameter.

Component 112 has associated with it a reference plane reference plane 210. If component 112 is a flat knob, reference plane 210 is typically parallel with the flat surface. Component 112 has associated a reference axis reference axis 220 orthogonal to reference plane 210. If component 112 has comprises a stick, then typically, reference axis 220 is incident with reference axis 220 and optionally substantially parallel with the stick.

FIGS. 2a and 2b show an origin 250 representing a pivot of component 112. During operation, the component 112 is tilted around origin 250. As component 112 is tilted a (virtual) point on component 112 (say the intersection of reference axis 220 and component 112) is moved to a point 270. The vector from origin 250 to point 270 is representative of the tilt of component 112; we will refer to the vector from origin 250 to point 270 as tilt 270. The orthogonal projection of tilt 270 is a direction lying in the reference plane indicated with 272. The vector from origin 250 to direction 272 is representative both for the direction of the tilt of component 112 and for the magnitude. The figure shows a further reference axis 260 lying in the reference plane 210. Further reference axis 260 may be used to indicate the direction 272 as an angle. Angle 240 between axis 260 and direction 272 is representative for the direction, e.g., as the angular coordinate. If needed the distance from origin 250 to direction 272 may be determined to obtain a radial coordinate. Alternatively, an angle 230 between axis 230 and tilt 270 may be determined to represent the magnitude of tilt 270. Axis 260 is oriented, as is indicated in FIG. 2b with an arrow.

The magnitude, e.g., a radial coordinate, may be used in an embodiment to ignore shifts bellow a certain threshold. It may happen that the sensitivity of the joystick is too large for casual use. By treating tilt with a small magnitude as if component 112 were in a neutral position the ease of use is increased. The threshold 250 is indicated as a circle in FIG. 2b, tilt for which the projection on the reference plane lies within the circle may be ignored.

We may regard direction 272 as a first direction lying the reference plane of a first tilt 270 at a particular sampling moment. At a later sampling moment, component 112 is tilted into a second tilt, which corresponds to a second direction lying 274 in the reference plane. The second tilt was not drawn in FIG. 2a but what has been said about tilt 270 applies mutatis mutandis to the second tilt. The projection of the second tilt is drawn in FIG. 2b as direction 274. The angle between axis 260 and direction 274 is indicated with reference numeral 242.

By computing angle 240 minus angle 242, a difference in direction between the first direction lying in the reference plane of the first tilt at a particular sampling moment and the second direction lying in the reference plane of a second tilt assumed at the succeeding one of the sampling moments is determined.

In the particular situation shown in FIG. 2b, the difference is negative.

In an embodiment, it is also verified that an intermediate direction is assumed between direction 272 and direction 274, and that the sampling moment at which the intermediate direction is assumed lies before that of direction 272 and that of direction 274.

Parameter modifier 130 may determine the start and end of a rotation input in various ways.

As a first example, parameter modifier 130 may take two subsequent sampling moments on which component 112 is tilted as the first and second tilt. In this way parameter modifier 130 will detect and report small changes in tilt. The receiving application in data processing system 140 can accumulate the changes if this is required by the context.

In a second example, parameter modifier 130 may detect a first sampling moment at which component 112 is tilted from a natural position. Next parameter modifier 130 may monitor each subsequent sampling moment, and determine when the sign of the difference in direction changes between two subsequent sampling moment changes. The last sampling moment that gives no sign change is taken as the second tilt. In this way larger differences in direction are reported, but the rate at which these differences are reported various as they depend on the user input.

Parameter modifier 130 may be integrated in joystick 110. This has the advantage that joystick 110 can directly report rotation information, i.e. differences in direction, to data processing system 140. As a result special hardware or software to accommodate parameter modifier 130 in data processing system 140 is avoided. This allows joystick 110 to be compatible with a wider range of data processing systems.

There are several formats in which a joystick can returns the tilted position it is in. A common format uses the (X,Y) coordinates. In this, this notation, a position is represented by a vector of two dimension (usually X and Y). Converting such a vector to an angle is a basic trigonometric subject. For example, taking the X axis, orientated towards increasing coordinates as a further reference axis, an angle with the further reference axis may be computed by arc tan(y/x).

Figure 3:
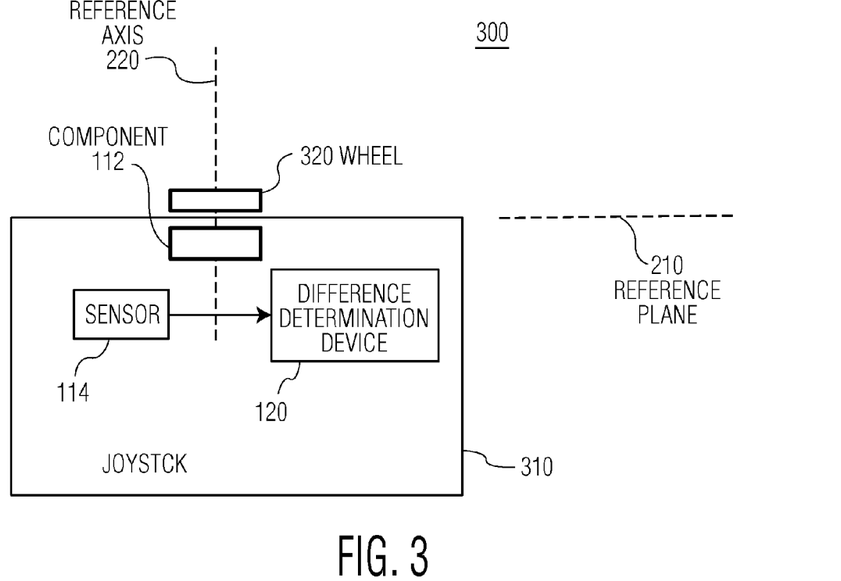
FIG. 3 is a block diagram illustrating schematically a second embodiment of the user interface according to the invention.

FIG. 3 shows a joystick 310, which may be used in combination with data processing system 140 and/or output device 150. Joystick 310 is the same as joystick 110 except that component 112 comprises a wheel 320. Wheel 320 has been attached to component 112 as a pivot. For example, the rotation axis of wheel 320 may coincide with reference axis 220. Preferably, component 112 is arranged sunken in joystick 110 so that only wheel 320 extends outside of joystick 110.

The user perceives joystick 310 as having two different input modes. In a first mode of input the joystick is tilted in the same way as joystick 110, and used as a pointing device; a tilt of component 112 is converted to coordinates such as Cartesian coordinates or polar coordinates, data processing system 140 uses the coordinates to move a pointer. For example, the coordinates may be converted to a planar vector which may be added to location coordinates of the pointer, followed by a re-rendering of the pointer. For example, using the first mode of input the user may give commands to data processing system 140, such as pointing commands accompanied by a context sensitive event, say a button pressed. Joystick 310 and 110 however also have a second mode of input. In the second mode of input rotation information is passed to data processing system 140. Data processing system 140 may use the rotation information to control an application, for example by modifying a parameter, such as adding or subtracting to a parameter.

Especially, in joystick 310 it will seem to the user that the joystick comprises two sensors, one for sensing the tilt of component 112, the other one for measuring the amount of rotation of wheel 320. However, in reality joystick 310 only has sensor 114. The rotation of wheel 320 is determined indirectly in the same way as in joystick 110. The wheel makes it easier for the user to give his rotation input, but does not in itself play a role in its measurement.

A difference in direction device may report information related to both types of mode to the data processing system.

The component is pivotally movable with respect to a pivot point. In FIG. 2, the pivot point is origin 250. In an embodiment, axis 220 coincides with a centerline of the component while it is in the neutral position, after a tilt of the component the centerline of the component still intersects origin 250; for example, in an embodiment vector 270 could be seen as the new centerline after a tilt. During and after the tilt the component thus remains in the same orientation with respect to the pivot point. In some embodiments the joystick and component are arranged with respect to each other that rotation around one pivot point is the only movement that the component can make. The centerline may be orthogonal to the component. Instead of a centerline another axis associated with the component may be used.

The movement of the component may be extended in various ways. For example, one could be extended it with a clicking movement, of the component towards the origin for indicating an event by the user to the user-interface.

For example, in an embodiment, the component may be taken as the reflecting unit in FIG. 2 of WO 2010/035170 and arranged in the joystick as described in the corresponding text; or as mirror 15 in FIG. 2 of WO2009/125360 and arranged in the joystick as described in the corresponding text. However the reflecting element or mirror could also be mechanically coupled to the component for passing the movement of the component to the sensor 114.

For example, in an extended embodiment, the component is also configured for a rotating movement with respect to an axis of the component, e.g., a centerline, for example by attaching a wheel to component.

Figure 4:
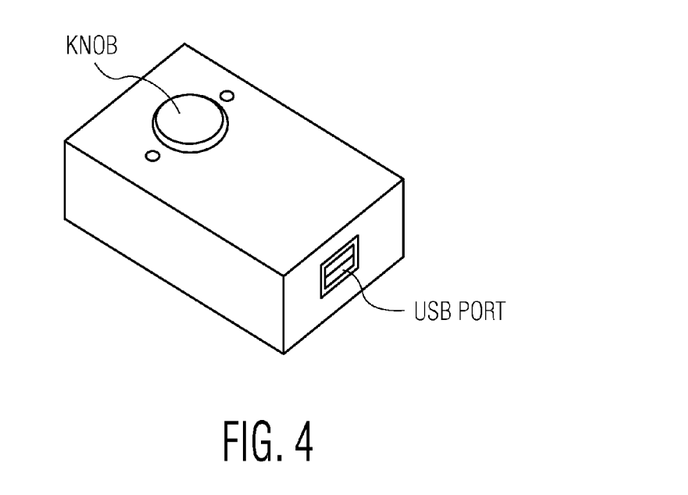
FIG. 4 is a picture showing a prototype of an embodiment of a joystick according to the invention.

FIG. 4 shows prototype of joystick 110. Visible is a closed box having a top surface out of which a knob protrudes. The knob has a flat surface. Also visible is a connector for connecting the joystick to data processing system 140. In this case a USB connection is used, but other types of electronic computer connections are also possible, such as, Ethernet, Wi-Fi, etc. The protocol for sending commands from joystick 110 or 310 to data processing system 140 may vary, apart from the USB protocol, a proprietary protocol, XML etc may be used.

Figure 5:
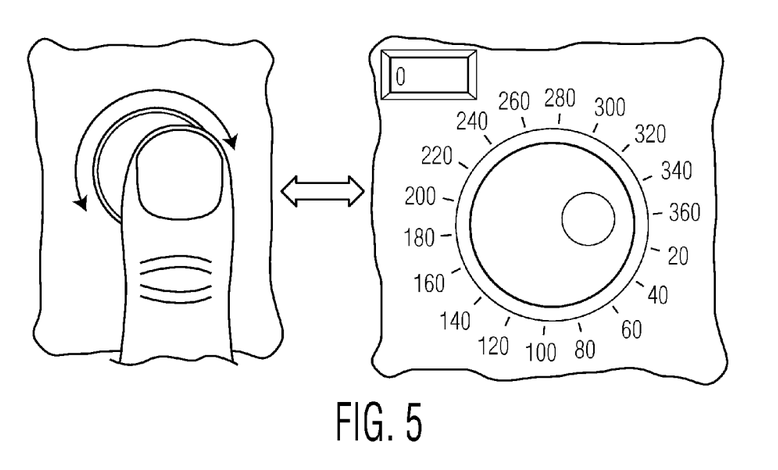
FIG. 5 is a picture illustrating on the left how a user may operate an embodiment of the invention and on the right a screenshot of a computer application.

FIG. 5 illustrates at the left the mode of operating joystick 110 and 310. A finger, typically a thumb is slided, or rubbed, across the top of component 112 in a circular motion. By doing that, component 112 is tilted first in a first position, which shifts to a second position. The difference between the direction in which component 112 is first tilted and in which component 112 is last tilted determines the amount of rotation that the user input to the user interface. The user interface may use this input in a variety of ways. FIG. 5 shows at the right a dial which moves in response to the difference in direction determined by parameter modifier 130. In one embodiment, a difference in direction of a particular angle results in a displayed rotation of the dial of the same particular angle. However, the displayed angle may differ from the particular angle. For example, the particular angle may be multiplied with a factor to obtain the displayed angle. The factor may be a predetermined angle, but the factor may also depend on the speed with which the user moves from the first direction to the second direction.

The difference in direction does not necessarily result in a change in a display; for example, the difference in direction may result in a change in a parameter which indicates the volume, as a result of which the volume changes. Furthermore, there is no reason to limit the display of the difference in direction to a dial; other possibilities include a sliding control, a scroll bar, etc.

Figure 6:
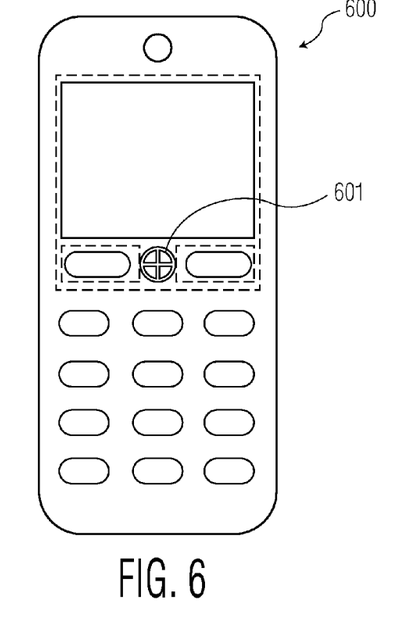
FIG. 6 is a picture illustrating a mobile phone according to the invention.

FIG. 6 shows a mobile phone 600 having a joystick 601 according to the invention. Mobile phone 600 is configured to obtain input of joystick 601 in the two modes. The second mode in which rotation input is received may be used to modify a parameter. For example, to control a scroll bar, modify a volume, change a display brightness, etc.

An embodiment of a method of obtaining input for a data processing system comprises a sequence of steps. In a first step at succeeding sampling moments a tilt of a pivotally movable component of a joystick is sensed. The tilt may, for example, be measured with respect to a virtual reference axis and a virtual reference plane associated with the component. For convenience we may take the reference plane orthogonal to the reference axis. The component is tilted by being inclined away from the reference axis into a direction lying in the reference plane. In a second step a difference in direction between the direction of a first tilt at a particular sampling moment and the direction of a second tilt assumed at a succeeding one of the sampling moments is determined. Optionally, the method also comprises a third step of modifying a parameter value of a parameter of the data processing system by adding or subtracting a difference value, the difference value depending upon the difference in direction.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform this method. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example, processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a RAM, a ROM, for example a CD ROM or a semiconductor ROM, or a magnetic recording medium, for example a floppy disc or hard disk. Furthermore, the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A user-interface for a data processing system, the user-interface comprising a joystick configured for manually controlling input to the data processing system, the joystick comprising:
    a single tilt sensor having associated therewith a reference axis and a reference plane orthogonal to the reference axis, the tilt sensor being enabled for assuming tilted positions by being inclined away from the reference axis in corresponding directions, the corresponding directions lying in the reference plane, and
    a sensor configured for sensing at succeeding sampling moments the direction corresponding to succeeding tilted positions of the tilt sensor,
    a difference determination device configured for determining a difference in direction between a first direction sensed at a first sampling moment and a second direction sensed at a second sampling moment after the first moment,
    a parameter modifier configured for modifying a parameter value of a parameter of the data processing system by adding or subtracting a difference value, the difference value depending upon the difference in direction; and
    wherein the user-interface is switchable between a pointing-mode configured to move a pointer to a set of display coordinates in response to movement of the single tilt sensor, and a rotational-mode configured to increment or decrement a non-display coordinate parameter of the data processing system in response to movement of the single tilt sensor.

2. A user-interface as in claim 1, wherein the tilt sensor has a flat surface in the direction of the reference axis, the flat surface being arranged for being inclined away by a user of the joystick.

3. A user-interface as in claim 2, wherein the surface is suitable for sliding over with a human finger in a circular motion.

4. A user-interface as in claim 1 wherein a wheel is attached to the tilt sensor rotatable with respect to the reference axis, the user interface being configured for indirect measurement of a rotation of the wheel by determining the difference in direction, the difference in direction being representative of the rotation.

5. A user-interface as in claim 1 wherein the magnitude of the difference value depends upon the magnitude of the difference in direction.

6. A user-interface as in claim 1 wherein a sign of the difference value depends upon an orientation of the difference in direction with respect to a further reference axis lying in the reference plane.

7. A user-interface as in claim 6, wherein the difference determination device is configured for determining a first orientation with respect to the further reference axis of the difference in direction between the first direction and an intermediate direction, and configured for determining a second orientation with respect to the further reference axis of the difference in direction between the intermediate direction and the second direction, the intermediate direction being sensed at an intermediate sampling moment, the intermediate sampling moment being between the first sampling moment and the second sampling moment, wherein
    the difference determination device is configured for determining the difference in direction between the first direction and the second direction only if the first orientation is the same as the second orientation.

8. A user-interface as in claim 1, wherein the sensor is configured for expressing a sensed direction corresponding with a tilted positions of the tilt sensor in coordinates with respect to a Cartesian coordinate system of the reference plane.

9. A user-interface as in claim 1, wherein a further reference axis lying in the reference plane is associated with the tilt sensor, the first direction and the second direction being expressed as an angle with the further reference axis.

10. A joystick configured for manually controlling input to a data processing system, the joystick comprising:
    a pivotally movable component having associated therewith a reference axis and a reference plane orthogonal to the reference axis, the component being enabled for assuming a tilted position by being inclined away from the reference axis into a direction lying in the reference plane,
    a sensor configured for sensing at succeeding sampling moments the direction corresponding with succeeding tilted positions of the component,
    difference determination device configured for determining a difference in direction between a first direction sensed at a first sampling moment and a second direction sensed at a second sampling moment after the first moment, the joystick being configured for supplying the difference in direction on a data output of the joystick.

11. A method of obtaining input for a data processing system, the method comprising:
    sensing at succeeding sampling moments a direction corresponding to succeeding tilted positions of a single tilt sensor of a joystick, the tilt sensor having associated therewith a reference axis and a reference plane orthogonal to the reference axis, the tilt sensor being tilted by being inclined away from the reference axis into corresponding directions, the corresponding directions lying in the reference plane,
    determining a difference in direction between a first direction sensed at a first sampling moment and a second direction sensed at a second sampling moment after the first moment;
    placing the single tilt sensor in a pointing-mode configured to move a pointer to a set of display coordinates in response to movement of the single tilt sensor; and
    switching the single tilt sensor to a rotational-mode configured to increment or decrement a non-display coordinate parameter of the data processing system in response to movement of the single tilt sensor.

12. A method as in claim 11, further comprising: modifying a parameter value of a parameter of the data processing system by adding or subtracting a difference value, the difference value depending upon the difference in direction.

13. A computer readable medium, comprising a non-transitory data storage device having computer program code adapted to perform all the steps of claim 11 when the computer program is run on a computer having a joystick.

* * * * *